US011425758B2

(12) United States Patent
Xie et al.

(10) Patent No.: US 11,425,758 B2
(45) Date of Patent: Aug. 23, 2022

(54) RANDOM ACCESS METHOD AND APPARATUS

(71) Applicant: HUAWEI TECHNOLOGIES CO., LTD., Shenzhen (CN)

(72) Inventors: Xinqian Xie, Beijing (CN); Zhiheng Guo, Beijing (CN); Yongqiang Fei, Beijing (CN); Wenping Bi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 16/940,688

(22) Filed: Jul. 28, 2020

(65) Prior Publication Data

US 2020/0359422 A1 Nov. 12, 2020

Related U.S. Application Data

(63) Continuation of application No. PCT/CN2019/072240, filed on Jan. 17, 2019.

(30) Foreign Application Priority Data

Jan. 31, 2018 (CN) .......................... 201810093785.X

(51) Int. Cl.
*H04W 74/08* (2009.01)
(52) U.S. Cl.
CPC .............................. *H04W 74/0833* (2013.01)
(58) Field of Classification Search
CPC ..................... H04W 74/0833; H04W 74/006
See application file for complete search history.

(56) References Cited

U.S. PATENT DOCUMENTS

2017/0251460 A1* 8/2017 Agiwal ................. H04B 7/0617
2019/0357264 A1* 11/2019 Yi ............................ H04L 5/001
2020/0383060 A1* 12/2020 Park ....................... H04W 52/42

FOREIGN PATENT DOCUMENTS

| CN | 102892192 A1 | 1/2013 |
| CN | 103037530 A | 4/2013 |

(Continued)

OTHER PUBLICATIONS

Samsung NPL "NR Random Access Summary and Impact on RAN4 RRM", 3GPP TSG-RAN, R4-1712240, Nov. 27-Dec. 1, 2017 (Year: 2017).*

(Continued)

*Primary Examiner* — Jamaal Henson
*Assistant Examiner* — Chuong M Nguyen
(74) *Attorney, Agent, or Firm* — WHDA, LLP

(57) ABSTRACT

A random access method and apparatus, the method includes: receiving, by a first node, first information sent by a second node, where the first information is used to determine a first transmit power, and the first transmit power is a power used when the first node sends downlink information to the second node over a first link; and the first link is a link between the first node and the second node, and the first node is an upper-level device of the second node; and determining, by the first node, the first transmit power based on the first information. Therefore, the first node determines the first transmit power based on the first information, and uses the first transmit power when sending the downlink information to the second node over the first link, so that interference between signals received by the second node can be reduced.

16 Claims, 4 Drawing Sheets

(56) References Cited

FOREIGN PATENT DOCUMENTS

| CN | 103718636 A | 4/2014 |
|---|---|---|
| CN | 106171029 A | 11/2016 |
| WO | 2012155693 A1 | 11/2012 |
| WO | 2016085287 A1 | 6/2016 |

OTHER PUBLICATIONS

ZTE NPL "Remaining details of RACH procedure", 3GPP TSG-RAN, R4-1719346, Nov. 27-Dec. 1, 2017 (Year: 2017).*
International Search Report dated Mar. 27, 2019 (Form PCT/ISA/210) with translation, with form PCT/ISA/220, and form PCT/ISA/237, issued in counterpart International Application No. PCT/CN2019/072240. (10 pages).
3GPP TS 38.133 V0.4.0 (Dec. 2017),3rd Generation Partnership Project;Technical Specification Group Radio Access Network;New Radio(NR);Requirements for support of radio resource management(Release 15), total 41 pages.
InterDigital, Inc., "Aspects related to Supplementary Uplink",3GPP TSG RAN WG1 Meeting AH1801 R1-1800605,Vancouver, Canada, Jan. 22-26, 2018,total 6 pages.
InterDigital Inc., "Random Access procedure on SUL",3GPP TSG-HAN WG2 #100 R2-1712783,Reno, USA, Nov. 27-Dec. 1, 2017,total 6 pages.
Huawei et al., "On the remaining details of RACH Procedures",3GPP TSG RAN WG1 Ad Hoc Meeting R1-1800064, Vancouver, Canada, Jan. 22 26, 2018,total 12 pages.
Zte et al., "Remaining details of RACH procedure",SGPP TSG HAN WG1 Meeting #91 R1-1719346,Reno, USA, Nov. 27-Dec. 1, 2017,total 30 pages.
Extended (Supplementary) European Search Report dated Dec. 11, 2020, issued in counterpart EP Application No. 19747359.8. (12 pages).
Samsung, NR Random Access Summary and Impact on RAN4 RRM Specification. 3GPP TSG-RAN WG4 Meeting #85, Reno, Nevada , USA, Nov. 27 Dec. 1, 2017, R4-1712240, 7 pages.
3GPP TS 38.321 V1.1.0 (Nov. 2017), 3rd Generation Partnership Project; Technical Specification Group Radio Access Network; NR; Medium Access Control (MAC) protocol specification (Release 15), 64 pages.
Office Action dated Nov. 19, 2020, issued in counterpart CN Application No. 201810093785.X, with English Translation. (15 pages).

* cited by examiner

RANDOM ACCESS METHOD AND APPARATUS

CROSS-REFERENCE TO RELATED APPLICATIONS

This application is a continuation of International Application No. PCT/CN2019/072240, filed on Jan. 17, 2019, which claims priority to Chinese Patent Application No. 201810093785.X, filed on Jan. 31, 2018. The disclosures of the aforementioned applications are hereby incorporated by reference in their entireties.

TECHNICAL FIELD

This application relates to the field of wireless communications technologies, and in particular, to a random access method and apparatus.

BACKGROUND

In the development and evolution process of a wireless communications system, both a 5G new radio (NR) system and a long term evolution (LTE) system may be deployed in a frequency band below 6 GHz. Currently, NR is most likely to be first deployed in a frequency band of a 3.5 GHz frequency. However, considering that uplink coverage of a system cannot match downlink coverage on the frequency, an uplink rate of the system is limited. Therefore, in the NR system, an uplink carrier is further deployed in another uplink frequency band. Specifically, the uplink carrier of the NR system may be deployed in an uplink frequency band of a 1.8 GHz frequency in the LTE system, to enhance uplink coverage of the NR system. In this way, both the LTE system and the NR system exist in the uplink frequency band in LTE system, that is, the NR system and the LTE system share one uplink frequency band. Certainly, the uplink carrier of the NR system may alternatively be deployed in a dedicated uplink frequency band, and the uplink frequency band is not shared with the LTE system or another system. Therefore, in addition to an uplink carrier deployed in the frequency band of the 3.5 GHz frequency, the uplink carrier deployed in another uplink frequency band in the NR system may be referred to as a supplementary uplink (SUL) carrier.

Currently, when a terminal device is configured with a 3.5 GHz uplink carrier and a 1.8 GHz uplink carrier (which is an SUL carrier), the terminal device compares a reference signal received power (RSRP) measured on a 3.5 GHz downlink carrier with an RSRP threshold (denoted as RSRP-th). RSRP-th is a parameter broadcast by a network device to all terminal devices in a cell. When RSRP≥RSRP-th, the terminal device selects the 3.5 GHz uplink carrier to perform random access. When RSRP≤RSRP-th, the terminal device selects the 1.8 GHz uplink carrier to perform random access.

However, in an existing solution of selecting an uplink carrier for random access based on a comparison result between RSRP and RSRP-th, that the uplink carrier selected by the terminal device is a proper uplink carrier cannot be ensured. Specifically, considering that an antenna configuration of the network device at 3.5 GHz may be different from an antenna configuration of the network device at 1.8 GHz, for example, a beam at 3.5 GHz is narrower than a beam at 1.8 GHz, and an antenna direction at 3.5 GHz may also be different from an antenna direction at 1.8 GHz, as shown in FIG. 1. In this way, in an actual network, that uplink coverage performance at 1.8 GHz in coverage of the network device is always better than uplink coverage performance at 3.5 GHz cannot be ensured, and in the cell, there may be some areas in which the uplink coverage performance at 3.5 GHz is better than the uplink coverage performance at 1.8 GHz. In this case, if the terminal device located in the area determines that RSRP<RSRP-th, and selects the 1.8 GHz uplink carrier to perform random access, the random access may fail. Therefore, it is necessary to design a more applicable random access method fore a scenario in which a 3.5 GHz uplink carrier and an SUL carrier are combined, to ensure uplink access performance.

SUMMARY

Embodiments of this application provide a random access method and apparatus, so that a terminal device selects a more appropriate uplink carrier.

According to a first aspect, a random access method is provided. The method includes:

receiving, by a terminal device, first indication information from a network device, where the first indication information indicates at least one SSB group, each of the at least one SSB group includes at least one SSB, and each SSB group corresponds to one random access mode; and sending, by the terminal device, a random access signal to the network device based on a random access mode corresponding to a target SSB group, where the target SSB group is one of the at least one SSB group.

Therefore, the terminal device receives the first indication information from the network device, where the first indication information indicates the at least one SSB group; and sends the random access signal to the network device based on the random access mode corresponding to the target SSB group. Because target SSB groups determined by terminal devices at different positions in a cell may be different, the terminal devices at different positions in the cell can send random access signals to the network device based on different random access modes. Compared with the prior art in which each terminal device sends a random access signal to a network device based on a same random access mode, this is more flexible. Therefore, a random access success rate of the terminal device can be improved.

In a possible design, the method further includes: determining, by the terminal device, a target SSB; and determining, by the terminal device, an SSB group to which the target SSB belongs as the target SSB group.

A method for determining the target SSB is not limited in this embodiment of this application. In this embodiment of this application, the target SSB is to be used by the terminal device to determine the used random access mode.

In a possible design, the at least one SSB group includes a first SSB group, and the first SSB group corresponds to a first random access mode. The first random access mode is that the terminal device sends the random access signal to the network device on a first uplink carrier. The first uplink carrier is one of a plurality of uplink carriers.

Therefore, when the at least one SSB group indicated by the first indication information includes the first SSB group, and the target SSB group is the first SSB group, the terminal device sends the random access signal to the network device based on the first random access mode. That is, the terminal device sends the random access signal to the network device on the first uplink carrier.

In a possible design, the at least one SSB group further includes a second SSB group, and the second SSB group corresponds to a second random access mode. The second random access mode is that the terminal device selects, based on a relationship between a reference signal received power and a first threshold, one uplink carrier from the plurality of uplink carriers to send the random access signal to the network device.

When the at least one SSB group indicated by the first indication information includes the second SSB group, and the target SSB group is the second SSB group, the terminal device sends the random access signal to the network device based on the second random access mode. That is, the terminal device selects, based on the relationship between the reference signal received power and the first threshold, one uplink carrier from the plurality of uplink carriers to send the random access signal to the network device.

In a possible design the second random access mode further indicates that the terminal device performs cell reselection when random access fails, or selects, from the plurality of uplink carriers when random access fails, one uplink carrier other than an uplink carrier selected for the first time to send the random access signal to the network device.

Therefore, in the second random access mode, a behavior of the terminal device after the random access fails may be further configured.

In a possible design, the at least one SSB group further includes a third SSB group and a fourth SSB group, the third SSB group corresponds to a third random access mode, and the fourth SSB group corresponds to a fourth random access mode; and the method further includes: receiving, by the terminal device, second indication information from the network device, where the second indication information indicates a second threshold and a third threshold; and the second threshold corresponds to the third SSB group, the third threshold corresponds to the fourth SSB group, and the second threshold is different from the third threshold; the third random access mode is that the terminal device selects, based on a relationship between a reference signal received power and the second threshold, one uplink carrier from the plurality of uplink carriers to send the random access signal to the network device; and the fourth random access mode is that the terminal device selects, based on a relationship between a reference signal received power and the third threshold, one uplink carrier from the plurality of uplink carriers to send the random access signal to the network device.

Therefore, when the at least one SSB group indicated by the first indication information includes the third SSB group, the second indication information indicates the second threshold, and the target SSB group is the third SSB group, the terminal device sends the random access signal to the network device based on the third random access mode. That is, the terminal device selects, based on a relationship between the reference signal received power and the second threshold, one uplink carrier from the plurality of uplink carriers to send the random access signal to the network device. Likewise, when the at least one SSB group indicated by the first indication information includes the fourth SSB group, the second indication information indicates the third threshold, and the target SSB group is the fourth SSB group, the terminal device sends the random access signal to the network device based on the fourth random access mode. That is, the terminal device selects, based on a relationship between the reference signal received power and the third threshold, one uplink carrier from the plurality of uplink carriers to send the random access signal to the network device.

Therefore, compared with the prior art in which a network device configures only one RSRP threshold, in this embodiment of this application, different RSRP thresholds are configured for different SSB groups, so that terminal devices at different positions in a cell can select an uplink carrier by using a better RSRP threshold, thereby improving a random access success rate of the terminal device.

In a possible design, the following is further included:

when the target SSB does not belong to any SSB group of the at least one SSB group, sending, by the terminal device, the random access signal to the network device based on a fifth random access mode.

Therefore, in the foregoing design, regardless of whether the target SSB belongs to any SSB group of the at least one SSB group, that the terminal device sends the random access signal to the network device based on an appropriate random access mode can be ensured.

In a possible design, the plurality of uplink carriers include at east the first uplink carrier and a second uplink carrier; and a frequency of the first uplink carrier is higher than that of the second uplink carrier, and/or the first uplink carrier is a TDD carrier, and the second uplink carrier is an SUL carrier.

According to a second aspect, a random access method is provided. The method includes:

determining, by a network device, first indication information, where the first indication information indicates at least one SSB group, each of the at least one SSB group includes at least one SSB, and each SSB group corresponds to one random access mode; and sending, by the network device, the first indication information to a terminal device.

Therefore, the network device sends the first indication information to the terminal device, so that terminal devices at different positions in a cell can send random access signals to the network device based on different random access modes. Compared with the prior art in which all terminal devices send random access signals to the network device based on a same random access mode, this is more flexible, and thereby improving a random access success rate of the terminal device.

In a possible design, the at least one SSB group includes a first SSB group, and the first SSB group corresponds to a first random access mode; the first random access mode is that the terminal device sends the random access signal to the network device on a first uplink carrier; and the first uplink carrier is one of a plurality of uplink carriers.

In a possible design, the at least one SSB group further includes a second SSB group, and the second SSB group corresponds to a second random access mode. The second random access mode is that the terminal device selects, based on a relationship between a reference signal received power and a first threshold, one uplink carrier from the plurality of uplink carriers to send the random access signal to the network device.

In a possible design, the at least one SSB group further includes a third SSB group and a fourth SSB group, the third SSB group corresponds to a third random access mode, and the fourth SSB group corresponds to a fourth random access mode; and the method further includes: sending, by the network device, second indication information to the terminal device, where the second indication information indicates a second threshold and a third threshold; and the second threshold corresponds to the third SSB group, the third threshold corresponds to the fourth SSB group, and the second threshold is different from the third threshold; the third random access mode is that the terminal device selects, based on a relationship between a reference signal received power and the second threshold, one uplink carrier from the plurality of uplink carriers to send the random access signal to the network device; and the fourth random access mode is that the terminal device selects, based on a relationship between a reference signal received power and the third threshold, one uplink carrier from the plurality of uplink carriers to send the random access signal to the network device.

In a possible design, the plurality of uplink carriers include at least the first uplink carrier and a second uplink carrier; and a frequency of the first uplink carrier is higher than that of the second uplink carrier, and/or the first uplink carrier is a TDD carrier, and the second uplink carrier is an SUL carrier.

According to a third aspect, an information receiving method is provided. The method includes: receiving, by a terminal device, first indication information from a network device, where the first indication information indicates at least one first synchronization signal/physical broadcast channel block SSB; and performing, by the terminal device, random access in a first mode when a target SSB is a first SSB.

In a possible design, the method further includes: performing, by the terminal device, random access in a second mode when the target SSB is not the first SSB, where the first mode is different from the second mode.

In a possible design, the method further includes: receiving, by the terminal device, second indication information from the network device, where the second indication information indicates at least one second SSB; and performing, by the terminal device, random access in the second mode when the target SSB is the second SSB, where the first mode is different from the second mode.

In a possible design, the method further includes: performing, by the terminal device, random access in a third mode when the target SSB is neither the first SSB nor the second SSB, where the third mode is different from both the first mode and the second mode.

In a possible design, the first mode is that the terminal device sends a random access signal on a first uplink carrier to the network device, and the second mode is that the terminal device selects one uplink carrier from the first uplink carrier and a second uplink carrier to send the random access signal to the network device; or the first mode is that the terminal device selects one uplink carrier from the first uplink carrier and the second uplink carrier to send the random access signal to the network device, and the second mode is that the terminal device sends the random access signal on the first uplink carrier to the network device.

In a possible design, a frequency of the first uplink carrier is higher than that of the second uplink carrier.

According to a fourth aspect, an information sending method is provided. The method includes: determining, by a network device, first indication information, where the first indication information indicates at least one first synchronization signal/physicalbroadcast channel block SSB; and sending, by the network device, the first indication information to the terminal device, so that the terminal device performs random access in a first mode when a target SSB is the first SSB.

In a possible design, the method further includes: sending, by the network device, second indication information to the terminal device, where the second indication information indicates at least one second SSB, so that the terminal device performs, random access in a second mode when the target SSB is the second SSB. The first mode is different from the second mode.

In a possible design, the first mode is that the terminal device sends a random access signal on a first uplink carrier to the network device, and the second mode is that the terminal device selects one uplink carrier from the first uplink carrier and a second uplink carrier to send the random access signal to the network device; or the first mode is that the terminal device selects one uplink carrier from the first uplink carrier and the second uplink carrier to send the random access signal to the network device, and the second mode is that the terminal device sends the random access signal on the first uplink carrier to the network device.

In a possible design, a frequency of the first uplink carrier is higher than that of the second uplink carrier.

According to a fifth aspect, this application provides a terminal device. The terminal device includes a transceiver, a processor, and a memory, where the memory is configured to store a computer program; and the processor invokes the computer program stored in the memory, and performs, via the transceiver, the method according to any one of the first aspect or the possible designs of the first aspect. For specific execution steps, refer to the first aspect. Details are not described herein again.

Alternatively, the processor invokes the computer program stored in the memory, and performs, via the transceiver, the method according to any one of the third aspect or the possible designs of the third aspect. For specific execution steps, refer to the third aspect. Details are not described herein again.

According to a sixth aspect, this application provides a network device. The network device includes a transceiver, a processor, and a memory, where the memory is configured to store a computer program; and the processor invokes the computer program stored in the memory, and performs, via the transceiver, the method according to any one of the second, aspect or the possible designs of the second aspect. For specific execution steps, refer to the second aspect. Details are not described herein again.

Alternatively, the processor invokes the computer program stored in the memory, and performs, via the transceiver, the method according to any one of the fourth aspect or the possible designs of the fourth aspect. For specific execution steps, refer to the fourth aspect. Details are not described herein again.

According to a seventh aspect, this application provides a random access apparatus to perform the method according to any one of the first aspect or the possible designs of the first aspect. Specifically, the apparatus includes units configured to perform the method according to any one of the first aspect or possible designs of the first aspect. Alternatively, the apparatus is configured to perform the method according to any one of the third aspect or the possible implementations of the third aspect. Specifically, the apparatus includes units configured to perform the method according to any one of the third aspect or the possible designs of the third aspect.

According to an eighth aspect, this application provides a random access apparatus to perform the method according to any one of the second aspect or the possible designs of the second aspect. Specifically, the apparatus includes units configured to perform the method according to any one of the second aspect or the possible designs of the second aspect. Alternatively, the apparatus is configured to perform the method according to any one of the fourth aspect or the possible implementations of the fourth aspect. Specifically, the apparatus includes units configured to perform the method according to any one of the fourth aspect or the possible designs of the fourth aspect.

According to a ninth aspect, this application further provides a computer-readable storage medium, where the computer-readable storage medium stores a computer program. When the computer program is run on a computer, the computer is enabled to perform the methods according to the foregoing aspects.

According to a tenth aspect, this application further provides a computer program product that includes a program. When the computer program product is run on a computer, the computer is enabled to perform the methods according to the foregoing aspects.

DESCRIPTION OF EMBODIMENTS

Figure 1:
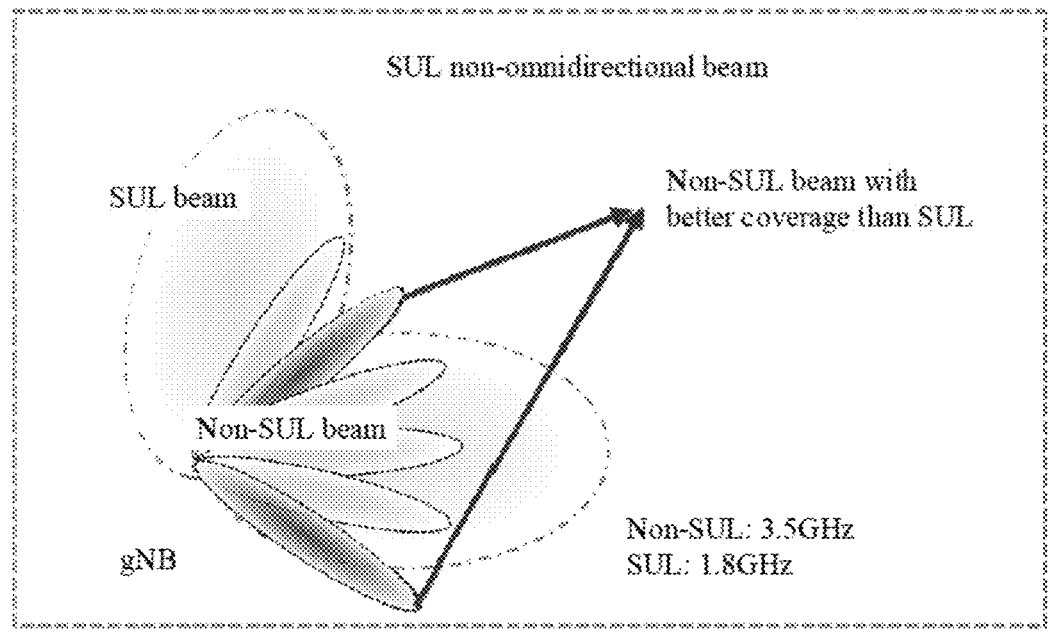
FIG. 1 is schematic diagram of a 3.5 GHz antenna configuration and a 1.8 GHz antenna configuration according to an embodiment of this application.

The following describes the embodiments of this application with reference to accompanying drawings.

A network device in the embodiments of this application is an access device that is connected to a mobile communications system by a terminal device in a wireless manner, and may be a base station (NodeB), an evolved NodeB (eNodeB), a base station in a 5G mobile communications system, a next generation mobile communications NodeB (next generation Node B, gNB), a base station in a future mobile communications system, an access node in a Wi-Fi system, or the like. A specific technology and a specific device form used by the network device are not limited in the embodiments of this application.

A terminal device (Terminal equipment) in the embodiments of this application may also be referred to as a terminal, user equipment (UE), a mobile station (MS), a mobile terminal (MT), or the like. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self driving (self driving), a wireless terminal in a remote medical surgery, a wireless terminal in a smart grid, a wireless terminal in transportation safety, a wireless terminal in a smart city, a wireless terminal in a smart home, or the like.

It should be noted that a synchronization signal/physical broadcast channel block (SS/PBCH block, SSB) is defined in a new radio technology in 5G. One SSB includes a primary synchronization signal (PSS), a secondary synchronization signal (SSS), and a physical broadcast channel (t PBCH). In time domain, one SSB occupies four consecutive orthogonal frequency division multiplexing (OFDM) symbols. In frequency domain, one SSB occupies 240 consecutive subcarriers, and the 240 subcarriers are numbered from 0 to 239. In an OFDM-based communications system, one frequency domain resource block (a resource block for short below) usually includes 12 consecutive subcarriers, and the 12 subcarriers are numbered from 0 to 11. Therefore, the 240 subcarriers occupied by one SSB may also be referred to as 20 resource blocks, and the 20 resource blocks are numbered from 0 to 19.

The embodiments of this application may be applied to a scenario in which there are a plurality of uplink carriers. It should be noted that the plurality of uplink carriers in the embodiments of this application may include at least two uplink carriers. In a possible design, the plurality of uplink carriers include a first uplink carrier and a second uplink carrier. A frequency of the first uplink carrier is higher than that of the second uplink carrier. For example, the first uplink carrier is a carrier in a 1.5 GHz frequency band, and the second uplink carrier is a carrier in a 1.8 GHz frequency hand. In a possible design, the plurality of uplink carriers include a first uplink carrier and a second uplink earlier. The first uplink carrier is a TDD carrier, and the second uplink carrier is an SUL carrier. In a possible design, the plurality of uplink carriers include a first uplink carrier and a second uplink carrier. The first uplink carrier is a TDD carrier, the second uplink carrier is an SUL carrier, and a frequency of the first uplink carrier is higher than that of the second uplink carrier.

Figure 2:
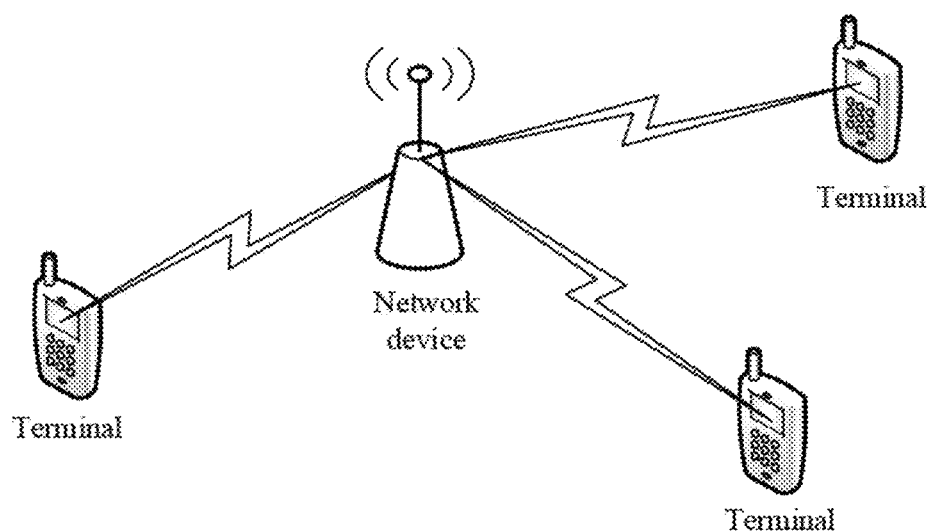
FIG. 2 is a schematic diagram of an application scenario according to an embodiment of this application.

FIG. 2 is a schematic diagram of a possible application scenario according to an embodiment of this application. A network device configures two uplink carriers, and both the two uplink carriers are used by a terminal device to send an uplink signal to the network device. Specifically, the network device may be an NR network device. One uplink carrier is an NR UL carrier, and the uplink carrier is a TDD uplink carrier. The other uplink carrier is an NR SUL carrier.

Figure 3:
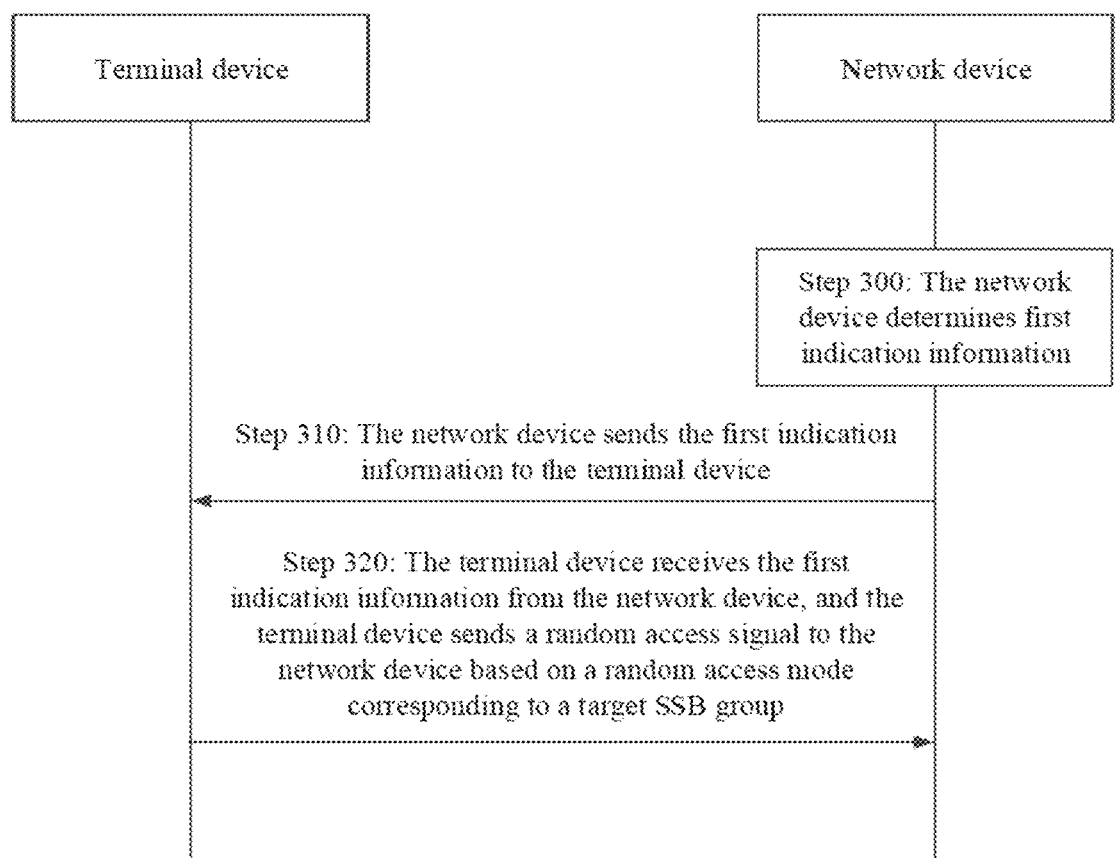
FIG. 3 is an overview flowchart of a random access method according to an embodiment of this application.

Referring to FIG. 3, an embodiment of this application provides a random access method, so that a terminal device selects an appropriate uplink carrier to perform random access, to ensure a random access success rate of the terminal device. The method includes the following steps.

Step 300: A network device determines first indication information.

The first indication information indicates at least one SSB group, each of the at least one SSB group includes at least one SSB, and each SSB group corresponds to one random access mode.

In this embodiment of this application, the SSB group is merely used to indicate that a quantity of SSBs corresponding to a same random access mode may be greater than or equal to 1, and does not constitute a limitation to this embodiment of this application. That is, the SSB group is used to indicate only one or more SSBs, and does not limit a concept of SSB group.

Optionally, any two SSB groups do not include a same SSB.

The following describes in detail the at least one SSB group and the random access mode corresponding to each SSB group in this embodiment of this application. Specifically, the at least one SSB group may include but is not limited to at least one of the following SSB groups:

A: First SSB group, where the first SSB group corresponds to a first random access mode.

The first random access mode is that the terminal device sends a random access signal to the network device on a first uplink carrier. The first uplink carrier is one of a plurality of uplink carriers. It should be understood that the plurality of uplink carriers are uplink carriers that can be used by the terminal device to send the random access signal.

Likewise, the at least one SSB group may further include a fifth SSB group, the fifth SSB group corresponds to a sixth random access mode, and the sixth random access mode is that the terminal device sends the random access signal to the network device on a second uplink carrier. The second uplink carrier is one of the plurality of uplink carriers.

B: Second SSB group, where the second SSB group corresponds to a second random access mode.

The second random access mode is that the terminal device selects, based on a relationship between a reference signal received power and a first threshold, one uplink carrier from the plurality of uplink carriers to send the random access signal to the network device.

Specifically, the second random access mode may be as follows: When the reference signal received power is greater than or equal to the first threshold, the terminal device sends the random access signal to the network device on the first uplink carrier; when the reference signal received power is less than the first threshold, the terminal device sends the random access signal to the network device on the second uplink carrier.

It should be understood that the reference signal received power is merely an example, or may be another parameter such as a signal received power. This is not limited in this application. The first threshold herein may be a value predefined in a protocol, or may be a value notified by the network device to the terminal device, or may be a value determined by the terminal device according to a preset rule, or may be determined by the terminal device based on statistical experience. This is not limited in this application.

In addition, the second random access mode may further indicate that the terminal device performs cell reselection when random access fails, or that the terminal device selects, from the plurality of uplink carriers when random access fails, one uplink carrier other than an uplink carrier selected for the first time to send the random access signal to the network device.

Optionally, the second random access mode may alternatively be as follows: When the reference signal received power is greater than or equal to the first threshold, the terminal device sends the random access signal to the network device on the first uplink carrier; when the reference signal received power is less than the first threshold, the terminal device sends the random access signal to the network device on the second uplink carrier. If the random access of the terminal device fails, the terminal device performs the cell reselection.

Optionally, the second random access mode may alternatively be as follows: When the reference signal received power is greater than or equal to the first threshold, the terminal device sends the random access signal to the network device on the first uplink carrier; when the reference signal received power is less than the first threshold, the terminal device sends the random access signal to the network device on the second uplink carrier. If the random access of the terminal device fails, the terminal device selects, from the plurality of uplink carriers, one uplink carrier other than the uplink carrier selected for the first time to send the random access signal to the network device.

C: A third SSB group and a fourth SSB group, where the third SSB group corresponds to a third random access mode, and the fourth SSB group corresponds to a fourth random access mode.

In a possible design, the network device further sends second indication information to the terminal device, and the second indication information indicates a second threshold and a third threshold. The second threshold corresponds to the third SSB group, the third threshold corresponds to the fourth SSB group, and the second threshold is different from the third threshold.

The third random access mode is that the terminal device selects, based on a relationship between the reference signal received power and the second threshold, one uplink carrier from the plurality of uplink carriers to send the random access signal to the network device.

The fourth random access mode is that the terminal device selects, based on a relationship between the reference signal received power and the third threshold, one uplink carrier from the plurality of uplink carriers to send the random access signal to the network device.

It should be understood that the first indication information and the second indication information may be included in one piece of signaling, or may be included in two pieces of signaling. The second threshold herein is configured for the third SSB group, the third threshold is configured for the fourth SSB group, and the second threshold is different from the third threshold. Therefore, compared with the prior art in which a network device configures only one RSRP threshold, in this embodiment of this application, different RSRP thresholds are configured for different SSB groups, so that terminal devices at different positions in a cell can select an uplink carrier by using a better RSRP threshold, thereby improving a random access success rate of the terminal device.

In a possible design, the first indication information indicates one SSB group, and a random access mode corresponding to the SSB group is that the terminal device sends the random access signal to the network device on the first uplink carrier.

In a possible design, the first indication information indicates two SSB groups. A random access mode corresponding to the first SSB group is sending the random access signal to the network device on the first uplink carrier. A random access mode corresponding to the second SSB group is as follows: When the reference signal received power is greater than or equal to the first threshold, the terminal device sends the random access signal to the network device on the first uplink carrier; when the reference signal received power is less than the first threshold, the terminal device sends the random access signal to the network device on the second uplink carrier. If the random access of the terminal device fails, the terminal device performs the cell reselection. Alternatively, the random access mode corresponding to the second SSB group is, as follows: When the reference signal received power is greater than or equal to the first threshold, the terminal device sends the random access signal to the network device on the first uplink carrier; when the reference signal received power is less than the first threshold, the terminal device sends the random access signal to the network device on the second uplink carrier. If the random access of the terminal device fails, the terminal device selects, from the plurality of uplink carriers, one uplink carrier other than the uplink carrier selected for the first time to send the random access signal to the network device.

In a possible design, the first indication information indicates two SSB groups: the third SSB group and the fourth SSB group, and the second indication information indicates the second threshold and the third threshold. The second threshold corresponds to the third SSB group, the third threshold corresponds to the fourth SSB group and the second threshold is different from the third threshold. The random access mode corresponding to the third SSB group is as follows: When the reference signal received power is greater than or equal to the second threshold, the terminal device sends the random access signal to the network device on the first uplink carrier; when the reference signal received power is less than the second threshold, the terminal device sends the random access signal to the network device on the second uplink carrier. The random access mode corresponding to the fourth SSB group is as follows: When the reference signal received power is greater than or equal to the third threshold, the terminal device sends the random access signal to the network device on the first uplink carrier; when the reference signal received power is less than the third threshold, the terminal device sends the random access signal to the network device on the second uplink earlier.

It should be understood that the foregoing possible designs are merely examples, and are not intended to limit this embodiment of this application.

In addition, the first indication information may indicate the at least one SSB group in an explicit indication manner or an implicit indication manner. Specifically, the first indication information may directly indicate a number of an SSB included in each SSB group, or indicate, in a bitmap form, an SSB included in each SSB group.

For example, the first indication information indicates the first SSB group. Specifically, the first indication information directly indicates numbers or indexes of SSBs included in the first SSB group, for example, a number 0 of an SSB and a number 1 of an SSB. It should be understood that the foregoing number of the SSB is merely an example, and is not intended to limit this embodiment of this application.

For another example, the first indication information indicates the first SSB group and the second SSB group. Specifically, the first indication information directly indicates the numbers or the indexes of the SSBs included in the first SSB group, and indirectly indicates numbers or indexes of SSBs included in the second SSB group. Specifically, when a total quantity of SSBs is 4, the first indication information directly indicates that the first SSB group includes the SSB whose number is 0 and the SSB whose number is 1. In this case, it should be understood that the first indication information indirectly indicates that the second SSB group includes an SSB whose number is 2 and an SSB whose number is 3. It should be understood that the total quantity of the SSBs and the number of the SSB are merely examples, and are not intended to limit this embodiment of this application.

For another example, the first indication information indicates the first SSB group, the second SSB group, and the third SSB group. Specifically, the first indication information directly indicates the numbers or the indexes of the SSBs included in the first SSB group and the numbers or the indexes of the SSB included in the second SSB group, and indirectly indicates numbers or indexes of SSBs included in the third. SSB group. Specifically, when the total quantity of SSBs is 4, the first indication information directly indicates that the first SSB includes the SSB whose number is 0 and the SSB whose number is 1, and the second SSB includes the SSB whose number is 2. In this case, it should be understood that the first indication information indirectly indicates that the third SSB includes the SSB whose number is 3. It should be understood that the total quantity of the SSBs and the number of the SSB are merely examples, and are not intended to limit this embodiment of this application.

For another example, the first indication information indicates the first SSB group. Specifically, the $i^{th}$ bit is used to indicate whether the first SSB group includes an SSB whose number is i. Optionally, when a value of the $i^{th}$ bit is 1, it indicates that the first SSB group includes the SSB whose number is I. When a value of the bit is 0, it indicates that the first SSB group does not include the SSB whose number is i. Specifically, when the total quantity of the SSBs is 4, the first indication information includes four bits. When the first indication information is 1100, the first indication information indicates that the first SSB group includes the SSB whose number is 0 and the SSB whose number is 1. It should be understood that the total quantity of the SSBs and the number of the SSB are merely examples, and are not intended to limit this embodiment of this application.

For another example, the first indication information indicates the first SSB group and the second SSB group. Specifically, the bit is used to indicate that the SSB whose number is i is the first SSB group or the second SSB group. Optionally, when a value of the $i^{th}$ bit is 1, it indicates that the SSB whose number is i is the first SSB group; when a value of the $i^{th}$ bit is 0, it indicates that the SSB whose number is i is the second SSB group. Specifically, when the total quantity of SSBs is 4, the first indication information includes four bits. When the first indication information is 1100, the first indication information indicates that the first SSB group includes the SSB whose number is 0 and the SSB whose number is 1. The second SSB group includes the SSB whose number is 2 and the SSB whose number is 3. It should be understood that the total quantity of the SSBs and the number of the SSB are merely examples, and are not intended to limit this embodiment of this application.

It should be noted that the foregoing examples are not intended to limit this embodiment of this application.

Step 310: The network device sends the first indication information to the terminal device.

Optionally, the first indication information is sent by the network device to a plurality of terminal devices. For example, the first indication information may be carried in remaining minimum system information (RMSI) or other system information (OSI), or certainly may be carried in other information. This is not limited herein.

Optionally, the first indication information carries information about the at least one SSB group, and the random access mode corresponding to each SSB group is predetermined in a protocol, or is notified by the network device to the terminal device by using other indication information.

Optionally, the first indication information carries the information about the at least one SSB group and information about the random access mode corresponding to each SSB group.

Step 320: The terminal device receives the first indication information from the network device, and the terminal device sends the random access signal to the network device based on a random access mode corresponding to a target SSB group. The target SSB group is one of the at least one SSB group.

Specifically, the terminal device first determines the target SSB, further determines an SSB group to which the target SSB belongs, and uses the SSB group to which the target SSB belongs as the target SSB group.

In a cell, the network device broadcasts a plurality of SSBs. These SSBs may correspond to different beams, or may correspond to a same beam. For one terminal device in the cell, the terminal device searches for an SSB during downlink synchronization, and the terminal device may search for the plurality of SSBs. Usually, the terminal device selects one SSB with strongest received signal strength from the plurality of SSBs as the target SSB, and camps on the target SSB. Alternatively, the terminal device selects, based on a relationship between a reference signal received power obtained through measurement on the plurality of SSBs and a preset threshold, one of one or more SSBs whose reference signal received power is greater than the preset threshold as the target SSB. Herein, how the terminal device determines the target SSB is not limited. For example, the terminal device may alternatively select, from two or more SSBs with strongest received signal strength, an SSB with a lowest frequency as the target SSB. Certainly, another method may alternatively be used.

After the terminal device determines the target SSB, when performing uplink access, the terminal device performs random access by using a random access resource corresponding to the target SSB, so that the network device can determine based on the random access resource, the target SSB determined by the terminal device. Therefore, the target SSB may be alternatively understood as an SSB corresponding to the random access resource used by the terminal device. Therefore, in this embodiment of this application, it is not limited that the target SSB can be used only to enable the terminal device to determine the used random access mode, and the target SSB may be used for another purpose.

Therefore, when the at least one SSB group indicated by the first indication information includes the first SSB group, and the target SSB group is the first SSB group, the terminal device sends the random access signal to the network device based on the first random access mode. That is, the terminal device sends the random access signal to the network device on the first uplink carrier.

When the at least one SSB group indicated by the first indication information includes the second SSB group, and the target SSB group is the second SSB group, the terminal device sends the random access signal to the network device based on the second random access mode. That is, the terminal device selects, based on the relationship between a reference signal received power and the first threshold, one uplink carrier from the plurality of uplink carriers to send the random access signal to the network device. For example, the terminal device may perform measurement on a TDD downlink carrier to obtain the reference signal received power. When the reference signal received power is greater than or equal to the first threshold, the terminal device selects the first uplink carrier from the first uplink carrier and the second uplink carrier to send the random access signal to the network device. When the reference signal received power is less than the first threshold, the terminal device selects the second uplink carrier from the first uplink carrier and the second uplink carrier to send the random access signal to the network device.

When the at least one SSB group indicated by the first indication information includes the third SSB group, the second indication information indicates the second threshold, and the target SSB group is the third SSB group, the terminal device sends the random access signal to the network device based on the third random access mode. That is, the terminal device selects, based on a relationship between a reference signal received power and the second threshold, one uplink carrier from the plurality of uplink carriers to send the random access signal to the network device. Likewise, when the at least one SSB group indicated by the first indication information includes the fourth SSB group, the second indication information indicates the third threshold, and the target SSB group is the fourth SSB group, the terminal device sends the random access signal to the network device based on the fourth random access mode. That is, the terminal device selects, based on a relationship between a reference signal received power and the third threshold, one uplink carrier from the plurality of uplink carriers to send the random access signal to the network device.

Therefore, the terminal device may select, based on the received first indication information, the SSB pow to which the target SSB belongs as the target SSB group, and send the random access signal to the network device based on the random access mode corresponding to the target SSB group. Because target SSBs determined by terminal devices at different positions in the cell are different, the target SSB groups determined by the terminal devices are not exactly the same. In addition, the network device configures one random access mode for each SSB group, and different SSB wows correspond to different random access modes. A random access mode corresponding to each SSB is a random access mode that is suitable to be used by the terminal device that selects the SSB group as the target SSB group. The terminal devices at different positions in the cell can send random access signals to the network device based on different random access modes. Compared with the prior art in which each terminal device sends a random access signal to a network device based on a same random access mode, this is more flexible. Therefore, a random access success rate of the terminal device can be improved.

In addition, in a possible design, when the target SSB does not belong to any SSB group of the at least one SSB group, the terminal device sends the random access signal to the network device based on a fifth random access mode. It should be understood that the first indication information indicates the at least one SSB group. The at least one SSB group herein may cover all SSBs, or may be only a subset of all SSBs.

For example, when the total quantity of SSBs is 4, the first indication information indicates the first SSB group, the first SSB group includes SSB 0 to SSB 3, and the random access mode corresponding to the first SSB group is the first random access mode. When the terminal device determines that the target SSB is an SSB 2, the terminal device sends the random access signal to the network device based on the first random access mode. When the terminal device determines that the target SSB is an SSB 4, the terminal device sends the random access signal to the network device based on the fifth random access mode. It should be understood that the total quantity of the SSBs and the number of the SSB are merely examples, and are not intended to limit this embodiment of this application.

In a possible design, the fifth random access mode herein may be the same as the second random access mode.

The following describes, with reference to specific embodiments, the random access method provided in this embodiments of this application.

The network device sends the first indication information to the terminal device, and the first indication information indicates the at least one first SSB.

When the target SSB is one of the at least one first SSB, the terminal device sends the random access signal to the network device based on the first random access mode.

When the target SSB is not any SSB in the at least one first SSB, the terminal device sends the random access signal to the network device based on the second random access mode, and the first random access mode is different from the second random access mode.

A random access mode corresponding to the at least one first SSB is the first random access mode, and a random access mode corresponding to an SSB other than the at least one first SSB is the second random access mode. The first random access mode is that the terminal device sends the random access signal to the network device on the first uplink carrier and the second random access mode is that the terminal device selects, based on the relationship between the reference signal received power and the first threshold, one uplink carrier from the first uplink carrier and the second uplink carrier to send the random access signal to the network device. Alternatively, the first random access mode is that the terminal device selects, based on the relationship between the reference signal received power and the first threshold, one uplink carrier from the first uplink carrier and the second uplink carrier to send the random access signal to the network device, and the second random access mode is that the terminal device sends the random access signal to the network device on the first uplink carrier. A frequency of the first uplink carrier is higher than that of the second uplink carrier.

For example, UE 1 and UE 2 receive the first indication information from the network device. The at least one first SSB includes the SSB 0 to the SSB 2. The first random access mode is that the terminal device sends the random access signal to the network device on the TDD uplink carrier, and the second random access mode is that the terminal device selects, based on a relationship between the RSRP and the RSRP threshold, one uplink carrier from the TDD uplink carrier and the SUL uplink carrier to send the random access signal to the network device.

When determining that the target SSB is the SSB 1, the UE 1 sends the random access signal to the network device on the TDD uplink carrier.

When the UE 2 determines that the target SSB is the SSB 3, if the RSRP measured by the UE 2 is greater than or equal to the RSRP threshold, the UE 2 sends the random access signal to the network device on the TDD uplink carrier; if the RSRP measured by the UE1 is less than the RSRP threshold, the UE2 sends the random access signal to the network device on the SUL uplink carrier.

Therefore, target SSBs determined by the terminal devices at different positions in the cell are different, the target SSBs determined by some terminal devices are one of the at least one first SSB, the terminal devices send random access signals to the network device based on the first random access mode, and target SSBs determined by the other terminal devices are not any one of the at least one first SSB, the terminal devices send random access signals to the network device based on the second random access mode. The terminal devices at different positions in the cell can send random access signals to the network device based on different random access modes. Compared with the prior art in which each terminal device sends a random access signal to a network device based on a same random access mode, this is more flexible. Therefore, a random access success rate of the terminal device can be improved.

The network device sends the first indication information to the terminal device, and the first indication information indicates the at least one SSB.

The network device sends the second indication information to the terminal device, and the second indication information indicates at least one second SSB.

When the target SSB is one of the at least one first SSB, the terminal device sends the random access signal to the network device based on the first random access mode.

When the target SSB is one SSB in the at least one second SSB, the terminal device sends the random access signal to the network device based on the second random access mode, and the first random access mode is different from the second random access mode.

When the target SSB is neither any SSB in the at least one first SSB nor any SSB in the at least one second SSB, the terminal device sends the random access signal to the network device based on the third random access mode, and the third random access mode is different from the first random access mode and the second random access mode.

The random access mode corresponding to the at least one first SSB is the first random access mode, the random access mode corresponding to the at least one second SSB is the second random access mode and the random access mode corresponding to an SSB other than the at least one first SSB and the at least one second SSB is the third random access mode. The first random access mode is that the terminal device sends the random access signal to the network device on the first uplink carrier. The second random access mode is that the terminal device selects, based on the relationship between the reference signal received power and the first threshold, one uplink earlier from the first uplink earlier and the second uplink carrier to send the random access signal to the network device, and the terminal device performs cell reselection when random access fails. The third random access mode is that the terminal device selects, based on the relationship between the reference signal received power and the first threshold, one uplink carrier from the first uplink carrier and the second uplink carrier to send the random access signal to the network device, and when the random access fails, selects, from the first uplink carrier and the second uplink carrier, one uplink carrier other than the uplink carrier selected for the first time, to send the random access signal to the network device. The frequency of the first uplink earlier is higher than that of the second uplink carrier.

For example, the UE 1, the UE 2, and the UE 3 receive the first indication information and the second indication information from the network device. The at least one first SSB includes the SSB 0 to the SSB 1, and the at least one second SSB includes the SSB 2. The first random access mode is that the terminal device sends the random access signal to the network device on the TDD carrier, and the second random access mode is that the terminal device selects, based on the relationship between the RSRP and the RSRP threshold, one uplink carrier from the TDD carrier and the SUL carrier to send the random access signal to the network device. The terminal device performs the cell reselection when the random access fails. The third random access mode is that the terminal device selects, based on the relationship between the RSRP and the RSRP threshold, one uplink carrier from the TDD carrier and the SUL carrier to send the random access signal to the network device, and when the random access fails, selects, from the first uplink carrier and the second uplink earlier, one uplink carrier other than the uplink carrier selected for the first time, to send the random access signal to the network device. It should be understood that the foregoing number of the UE and number of the SSB are merely examples, and are not intended to limit this embodiment of this application.

When determining that the target SSB is the SSB 1, the UE 1 sends the random access signal to the network device on the TDD uplink carrier.

When the UE 2 determines that the target SSB is the SSB 2, if the RSRP measured by the UE 2 is greater than or equal to the RSRP threshold, the UE 2 sends the random access signal to the network device on the TDD carrier; if the RSRP measured by the UE 2 is less than the RSRP threshold, the UE 2 sends the random access signal to the network device on the SUL carrier. When the random access of the UE 1 fails, the UE 1 performs cell reselection.

When the UE 3 determines that the target SSB is the SSB 3, if the RSRP measured by the UE 3 is greater than or equal to the RSRP threshold, the UE 3 sends the random access signal to the network device on the TDD carrier. When the random access of the UE 3 fails, the UE 3 sends the random access signal to the network device on the SUL carrier. If the RSRP measured by the UE 3 is less than the RSRP threshold, the UE 3 sends the random access signal to the network device on the SUL carrier. When the random access of the UE 3 fails, the UE 3 sends the random access signal to the network device on the TDD carrier.

Therefore, the target SSBs determined by the terminal devices at different positions in the cell are different. Target SSBs determined by some terminal devices are one of the at least one first SSB, and the terminal devices send random access signal to the network device based on the first random access mode. Target SSBs determined by some terminal devices are one of the at least one second SSB, and the terminal devices send random access signals to the network device based on the second random access mode. Target SSBs determined by some terminal devices are neither any one of the at least one first SSB nor any one of the at least one second SSB, the terminal devices send random access signals to the network device based on the third random access mode. Therefore, the terminal devices at different positions in the cell can send random access signals to the network device based on different random access modes. Compared with the prior art in which each terminal device sends a random access signal to a network device based on a same random access mode, this is more flexible. Therefore, a random access success rate of the terminal device can be improved.

The network device sends the first indication information to the terminal device, and the first indication information indicates the at least one first SSB and the at least one second SSB.

The network device sends the second indication information to the terminal device, and the second indication information indicates the first threshold corresponding to the at least one first SSB and the second threshold corresponding to the at least one second SSB.

When the target SSB is one of the at least one first SSB, the terminal device sends the random access signal to the network device based on the first random access mode.

When the target SSB is one SSB in the at least one second SSB, the terminal device sends the random access signal to the network device based on the second random access mode, and the first random access mode is different from the second random access mode.

When the target SSB is neither any SSB in the at least one first SSB nor any SSB in the at least one second SSB, the terminal device sends the random access signal to the network device based on the third random access mode, and the third random access mode is different from the first random access mode and the second random access mode.

The random access mode corresponding to the at least one first SSB is the first random access mode, the random access mode corresponding to the at least one second SSB is the second random access mode, and the random access mode corresponding to an SSB other than the at least one first SSB and the at least one second SSB is the third random access mode. The first random access mode is that the terminal device selects one uplink carrier from the first uplink carrier and the second uplink carrier based on the relationship between the reference signal received power and the first threshold, to send the random access signal to the network device. The second random access mode is that the terminal device selects, based on the relationship between the reference signal received power and the second threshold, one uplink carrier from the first uplink carrier and the second uplink carrier to send the random access signal to the network device. The third random access mode is that the terminal device selects, based on the relationship between the reference signal received power and the third threshold, one uplink earlier from the first uplink carrier and the second uplink carrier to send the random access signal to the network device. The frequency of the first uplink carrier is higher than that of the second uplink carrier.

For example, the UE 1, the UE 2, and the UE 3 receive the first indication information and the second indication information from the network device. The at least one first SSB includes the SSB 0 to the SSB 1, and the at least one second SSB includes the SSB 2. The first random access mode is that the terminal device selects, based on a relationship between the RSRP and the first threshold, one uplink carrier from the TDD carrier and the SUL carrier to send the random access signal to the network device. The second random access mode is that the terminal device selects, based on a relationship between the RSRP and the second threshold, one uplink carrier from the TDD carrier and the SUL carrier to send the random access signal to the network device. The third random access mode is that the terminal device selects, based on a relationship between the RSRP and the third threshold, one uplink carrier from the TDD carrier and the SUL carrier to send the random access signal to the network device. A value of the first threshold, a value of the second threshold, and a value of the third threshold are not equal to each other. However, the values of the thresholds are not limited herein, and may be equal or unequal. It should be understood that the foregoing number of the UE and number of the SSB are merely examples, and are not intended to limit this embodiment of this application.

When the UE 1 determines that the target SSB is the SSB 1, if the RSRP measured by the UE 1 is greater than or equal to the RSRP threshold, the UT 1 sends the random access signal to the network device on the TDD carrier; if the RSRP measured by the UE 1 is less than the RSRP threshold, the UE 1 sends the random access signal to the network device on the SUL carrier.

When the UE 2 determines that the target SSB is the SSB 2, if the RSRP measured by the UE 2 is greater than or equal to the RSRP threshold, the UE 2 sends the random access signal to the network device on the TDD carrier; if the RSRP measured by the UE 2 is less than the RSRP threshold, the UE 2 sends the random access signal to the network device on the SUL carrier.

When the UE 3 determines that the target SSB is the SSB 3, if the RSRP measured by the UE 3 is greater than or equal to the RSRP threshold, the UE 3 sends the random access signal to the network device on the TDD carrier; if the RSRP measured by the UE 3 is less than the RSRP threshold, the UE 3 sends the random access signal to the network device on the SUL carrier.

Therefore, the target SSBs determined by the terminal devices at different positions in the cell are different. Target SSBs determined by some terminal devices are one of the at least one first SSB, and the terminal devices send random access signal to the network device based on the first random access mode. Target SSBs determined by some terminal devices are one of the at least one second SSB, and the terminal devices send random access signals to the network device based on the second random access mode. Target SSBs determined by some terminal devices are neither any one of the at least one first SSB nor any one of the at least one second SSB, the terminal devices send random access signals to the network device based on the third random access mode. Different random access manners correspond to different thresholds. The terminal devices at different positions in the cell can select uplink carriers by using appropriate RSRP thresholds, thereby improving a random access success rate of the terminal device.

Figure 4:
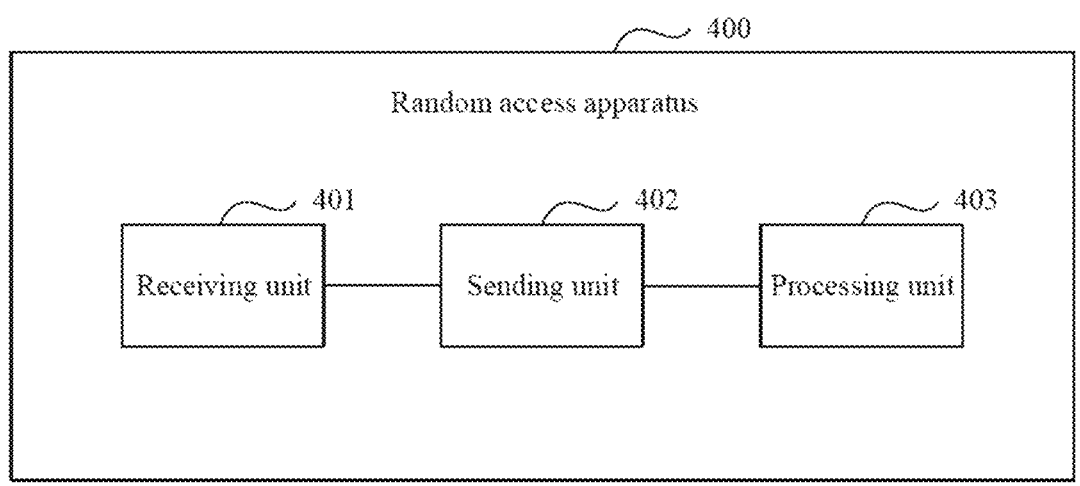
FIG. 4 is a first schematic structural diagram of a random access apparatus according to an embodiment of this application.

Based on the foregoing embodiment, an embodiment of this application provides a random access apparatus. As shown in FIG. 4, the apparatus includes:

a receiving unit 401, configured to receive first indication information from a network device, where the first indication information indicates at least one SSB group, each of the at least one SSB group includes at least one SSB, and each SSB group corresponds to one random access mode; and a sending unit 402, configured to send a random access signal to the network device based on a random access mode corresponding to a target SSB group, where the target SSB group is one of the at least one SSB group.

In a possible design, the following is further included:

a processing unit 403, configured to: determine a target SSB; and determine an SSB group to which the target SSB belongs as the target SSB group.

In a possible design, the at least one SSB group includes a first SSB group, and the first SSB group corresponds to a first random access mode; and the first random access mode is sending the random access signal to the network device on a first uplink carrier, and the first uplink carrier is one of a plurality of uplink carriers.

In a possible design, the at least one SSB group further includes a second SSB group, and the second SSB group corresponds to a second random access mode; and the second random access mode is selecting, based on a relationship between a reference signal received power and a first threshold, one uplink carrier from the plurality of uplink carriers to send the random access signal to the network device.

In a possible design, the at least one SSB group further includes a third SSB group and a fourth SSB group, the third SSB group corresponds to a third random access mode, and the fourth SSB group corresponds to a fourth random access mode; and the receiving unit 401 is further configured to receive second indication information from the network device, where the second indication information indicates a second threshold and a third threshold; and the second threshold corresponds to the third SSB group, the third threshold corresponds to the fourth SSB group, and the second threshold is different from the third threshold; the third random access mode is selecting, based on a relationship between a reference signal received power and the second threshold, one uplink carrier from the plurality of uplink carriers to send the random access signal to the network device; and the fourth random access mode is selecting, based on a relationship between a reference signal received power and the third threshold, one uplink carrier from the plurality of uplink carriers to send the random access signal to the network device.

In a possible design, the following is further included:

the sending unit 402, further configured to: when the target SSB does not belong to any SSB group of the at least one SSB group, send the random access signal to the network device based on a fifth random access mode.

In a possible design, the plurality of uplink carriers include at least the first uplink carrier and a second uplink carrier; and a frequency of the first uplink carrier is higher than that of the second uplink carrier, and/or the first uplink carrier is a time division duplex TDD carrier, and the second uplink carrier is a supplementary uplink SUL carrier.

It may be understood that, for specific implementations and corresponding beneficial effects of function blocks included in the random access apparatus in FIG. 4, refer to the specific descriptions of the embodiment shown in FIG. 3. Details are not described herein.

Figure 5:
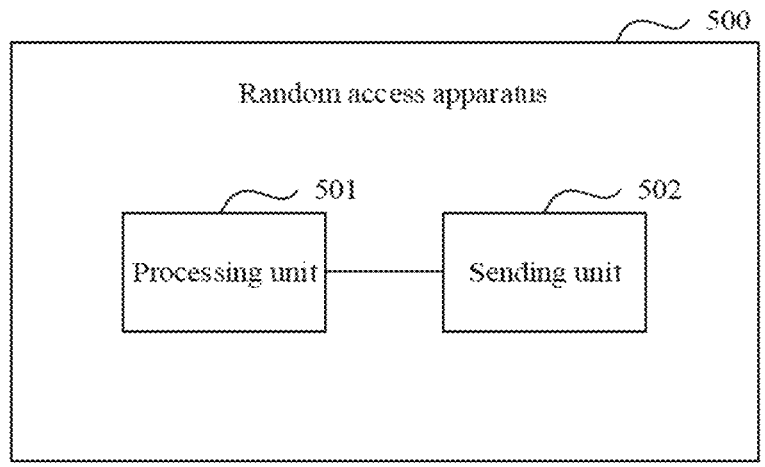
FIG. 5 is a second schematic structural diagram of a random access apparatus according to an embodiment of this application.

Based on the foregoing embodiment, an embodiment of this application provides a random access apparatus. As shown in FIG. 5, the apparatus includes:

a processing unit 501, configured to determine first indication information, where the first indication information indicates at least one SSB group, each of the at least one SSB group includes at least one SSB, and each SSB group corresponds to one random access mode; and a sending unit 502, configured to send the first indication information to a terminal device.

In a possible design, the at least one SSB group includes a first SSB group, and the first SSB group corresponds to a first random access mode; and, the first random access mode is that the terminal device sends a random access signal to the network device on a first uplink carrier, and the first uplink carrier is one of a plurality of uplink carriers.

In a possible design, the at least one SSB group further includes a second SSB group, and the second SSB group corresponds to a second random access mode; and the second random access mode is that the terminal device selects, based on a relationship between a reference signal received power and a first threshold, one uplink carrier from the plurality of uplink carriers to send the random access signal to the network device.

In a possible design, the at least one SSB group further includes a third SSB group and a fourth SSB group, the third SSB group corresponds to a third random access mode, and the fourth SSB group corresponds to a fourth random access mode; and the sending unit 502 is further configured to:

send second indication information to the terminal device, where the second indication information indicates a second threshold and a third threshold; and the second threshold corresponds to the third SSB group, the third threshold corresponds to the fourth SSB group, and the second threshold is different from the third threshold; the third random access mode is that the terminal device selects, based on a relationship between a reference signal received power and the second threshold, one uplink carrier from the plurality of uplink carriers to send the random access signal to the network device; and the fourth random access mode is that the terminal device selects, based on a relationship between a reference signal received power and the third threshold, one uplink carrier from the plurality of uplink carriers to send the random access signal to the network device.

In a possible design, the plurality of uplink carriers include at east the first uplink carrier and a second uplink carrier; and a frequency of the first uplink carrier is higher than that of the second uplink carrier, and/or the first uplink carrier is a TDD carrier, and the second uplink carrier is an SUL carrier.

It may be understood that, for specific implementations and corresponding beneficial effects of function blocks included in the random access apparatus in FIG. 5, refer to the specific descriptions of the embodiment shown in FIG. 3. Details are not described herein.

It should be understood that division of the foregoing units is merely logical function division. During actual implementation, all or some of the units may be integrated into one physical entity, or may be physically separated. In addition, the units all may be implemented by software invoked by a processing element, or all may be implemented by hardware, or some units may be implemented by software invoked by a processing element, and some units are implemented by hardware. In an implementation process, steps in the foregoing methods or the foregoing units can be implemented by using a hardware integrated logical circuit in the processing element, or by using instructions in a form of software.

For example, the foregoing units may be configured as one or more integrated circuits for implementing the foregoing method, for example, one or more application-specific integrated circuits (ASIC), or one or more microprocessors (digital signal processor, DSP), or one or more field programmable gate arrays (FPGA). For another example, when one of the foregoing units is implemented by a processing element invoking a program, the processing element may be a general-purpose processor, such as a central processing unit (CPU) or another processor that can invoke a program. For another example, the units can be integrated together and implemented in a form of a system-on-a-chip (SOC).

Figure 6:
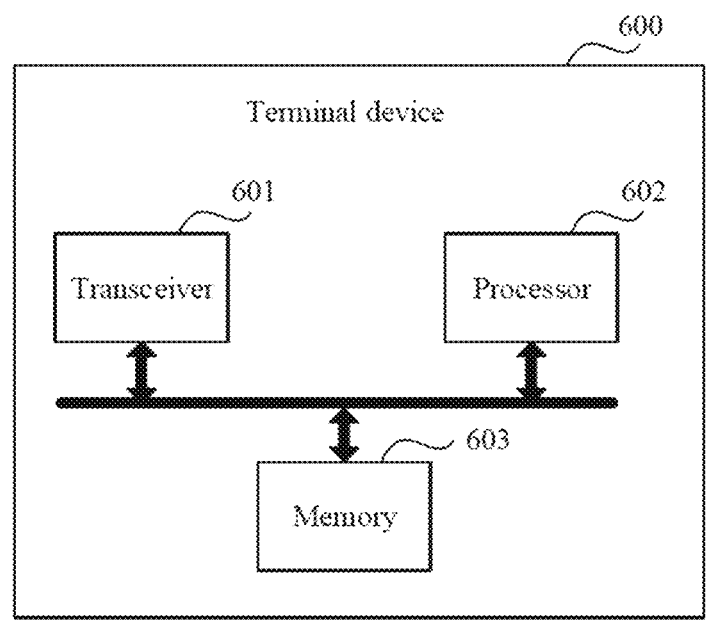
FIG. 6 is a schematic structural diagram of a terminal device according to an embodiment of this application.

Based on the foregoing embodiments, an embodiment of this application further provides a terminal device, configured to implement the method shown in FIG. 3. Referring to FIG. 6, the terminal device 600 includes a transceiver 601, a processor 602, and a memory 603. The memory 603 is configured to store a computer program. The processor 602 invokes the computer program stored in the memory 603, and performs via the transceiver 601, the method shown in FIG. 3.

It may be understood that the random access apparatus in the embodiment shown in FIG. 4 may be implemented by the terminal device 600 shown in FIG. 6. A structure of the terminal device 600 does not constitute a limitation to this embodiment of this application.

Figure 7:
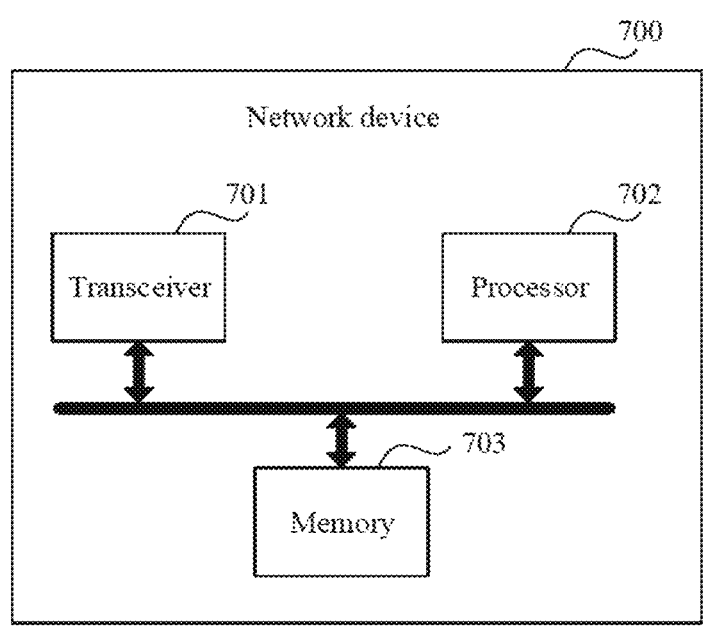
FIG. 7 is a schematic structural diagram of a network device according to an embodiment of this application.

Based on the foregoing embodiments, an embodiment of this application further provides a network device, configured to implement the method shown in FIG. 3. Referring to FIG. 7, the network device 700 includes a transceiver 701, a processor 702, and a memory 703. The memory 703 is configured to store a computer program. The processor 702 invokes the computer program stored in the memory 703, and performs, via the transceiver 701, the method shown in FIG. 3.

It may be understood that the random access apparatus in the embodiment shown in FIG. 5 may be implemented by the network device 700 shown in FIG. 7. A structure of the network device 700 does not constitute a limitation to this embodiment of this application.

In FIG. 6 and FIG. 7, the processor may be a CPU, a network processor (NP), a hardware chip, or any combination thereof. The memory may include a volatile memory such as a random access memory (RAM), or the memory may include a non-volatile memory such as a read-only memory (ROM), a flash memory, a hard disk drive (HDD), or a solid-state drive (SSD), or the memory may include a combination of the foregoing types of memories.

In conclusion, the terminal device receives the first indication information, and the first indication information indicates the at least one SSB group. The terminal device sends the random access signal to the network device based on the random access mode corresponding to the target SSB group. Target SSB groups determined by the terminal devices at different positions in the cell are different, and the network device configures a random access mode for each SSB group. Different SSB groups correspond to different random access modes. Therefore, the terminal devices at different positions in the cell can send random access signals to the network device based on different random access modes. Compared with the prior art in which each terminal device sends a random access signal to a network device based on a same random access mode, this is more flexible. Therefore, a random access success rate of the terminal device can be improved.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing, device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating, computer-implemented processing. Therefore, the instructions executed on the computer or the another programmable device provide steps for implementing a specific function in one or more processes in the flowcharts and/or in one or more blocks in the block diagrams.

Clearly, a person skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A random access method, wherein the method comprises:
receiving, by a terminal device, first indication information from a network device, wherein the first indication information indicates at least one synchronization signal/physical broadcast channel block (SSB) group, each of the at least one SSB group comprises at least one SSB, and each SSB group corresponds to one random access mode;
sending, by the terminal device, a random access signal to the network device based on a random access mode corresponding to a target SSB group, wherein the target SSB group is one of the at least one SSB group;
wherein the at least one SSB group further comprises a third SSB group and a fourth SSB group, the third SSB group corresponds to a third random access mode, and the fourth SSB group corresponds to a fourth random access mode; and
the method further comprises:
receiving, by the terminal device, second indication information from the network device, wherein the second indication information indicates a second threshold and a third threshold; and
the second threshold corresponds to the third SSB group, the third threshold corresponds to the fourth SSB group, and the second threshold is different from the third threshold; the third random access mode is that the terminal device selects, based on a relationship between a reference signal received power and the second threshold, one uplink carrier from the plurality of uplink carriers to send the random access signal to the network device; and the fourth random access mode is that the terminal device selects, based on a relationship between a reference signal received power and the third threshold, one uplink carrier from the plurality of uplink carriers to send the random access signal to the network device.

2. The method according to claim 1, further comprising:
determining, by the terminal device, a target SSB; and
determining, by the terminal device, an SSB group to which the target SSB belongs as the target SSB group.

3. The method according to claim 2, further comprising:
when the target SSB does not belong to any SSB group of the at least one SSB group, sending, by the terminal device, the random access signal to the network device based on a fifth random access mode.

4. The method according to claim 1, wherein the at least one SSB group comprises a first SSB group, and the first SSB group corresponds to a first random access mode; and
the first random access mode is that the terminal device sends the random access signal to the network device on a first uplink carrier, and the first uplink carrier is one of a plurality of uplink carriers.

5. The method according to claim 4, wherein the at least one SSB group further comprises a second SSB group, and the second SSB group corresponds to a second random access mode; and
the second random access mode is that the terminal device selects, based on a relationship between a reference signal received power and a first threshold, one uplink carrier from the plurality of uplink carriers to send the random access signal to the network device.

6. A random access method, wherein the method comprises:
determining, by a network device, first indication information, wherein the first indication information indicates at least one synchronization signal/physical broadcast channel block (SSB) group, each of the at least one SSB group comprises at least one SSB, and each SSB group corresponds to one random access mode;
sending, by the network device, the first indication information to the terminal device;
wherein the at least one SSB group further comprises a third SSB group and a fourth SSB group, the third SSB group corresponds to a third random access mode, and the fourth SSB group corresponds to a fourth random access mode; and
the method further comprises:
sending, by the network device, second indication information to the terminal device, wherein the second indication information indicates a second threshold and a third threshold; and
the second threshold corresponds to the third SSB group, the third threshold corresponds to the fourth SSB group, and the second threshold is different from the third threshold; the third random access mode is that the terminal device selects, based on a relationship between a reference signal received power and the second threshold, one uplink carrier from the plurality of uplink carriers to send the random access signal to the network device; and the fourth random access mode is that the terminal device selects, based on a relationship between a reference signal received power and the third threshold, one uplink carrier from the plurality of uplink carriers to send the random access signal to the network device.

7. The method according to claim 6, wherein the at least one SSB group comprises a first SSB group, and the first SSB group corresponds to a first random access mode; and
the first random access mode is that the terminal device sends the random access signal to the network device on a first uplink carrier, and the first uplink carrier is one of a plurality of uplink carriers.

8. The method according to claim 7, wherein the at least one SSB group further comprises a second SSB group, and the second SSB group corresponds to a second random access mode; and
the second random access mode is that the terminal device selects, based on a relationship between a reference signal received power and a first threshold, one uplink carrier from the plurality of uplink carriers to send the random access signal to the network device.

9. A random access apparatus, wherein the apparatus comprises:
a receiving unit, configured to receive first indication information from a network device, wherein the first indication information indicates at least one synchronization signal/physical broadcast channel block (SSB) group, each of the at least one SSB group comprises at least one SSB, and each SSB group corresponds to one random access mode;
a sending unit, configured to send a random access signal to the network device based on a random access mode corresponding to a target SSB group, wherein the target SSB group is one of the at least one SSB group;
wherein the at least one SSB group further comprises a third SSB group and a fourth SSB group, the third SSB group corresponds to a third random access mode, and the fourth SSB group corresponds to a fourth random access mode; and the receiving unit is further configured to receive second indication information from the network device, wherein the second indication information indicates a second threshold and a third threshold; and the second threshold corresponds to the third SSB group, the third threshold corresponds to the fourth SSB group, and the second threshold is different from the third threshold; the third random access mode is selecting, based on a relationship between a reference signal received power and the second threshold, one uplink carrier from the plurality of uplink carriers to send the random access signal to the network device; and the fourth random access mode is selecting, based on a relationship between a reference signal received power and the third threshold, one uplink carrier from the plurality of uplink carriers to send the random access signal to the network device.

10. The apparatus according to claim 9, further comprising:

a processing unit, configured to: determine a target SSB; and determine an SSB group to which the target SSB belongs as the target SSB group.

11. The apparatus according to claim 10, further comprising:

the sending unit, further configured to: when the target SSB does not belong to any SSB group of the at least one SSB group, send the random access signal to the network device based on a fifth random access mode.

12. The apparatus according to claim 9, wherein the at least one SSB group comprises a first SSB group, and the first SSB group corresponds to a first random access mode; and the first random access mode is sending the random access signal to the network device on a first uplink carrier, and the first uplink carrier is one of a plurality of uplink carriers.

13. The apparatus according to claim 12, wherein the at least one SSB group further comprises a second SSB group, and the second SSB group corresponds to a second random access mode; and the second random access mode is selecting, based on a relationship between a reference signal received power and a first threshold, one uplink carrier from the plurality of uplink carriers to send the random access signal to the network device.

14. A random access apparatus, wherein the apparatus comprises:

a processing unit, configured to determine first indication information, wherein the first indication information indicates at least one synchronization signal/physical broadcast channel block (SSB) group, each of the at least one SSB group comprises at least one SSB, and each SSB group corresponds to one random access mode;

a sending unit, configured to send the first indication information to a terminal device;

wherein the at least one SSB group further comprises a third SSB group and a fourth SSB group, the third SSB group corresponds to a third random access mode, and the fourth SSB group corresponds to a fourth random access mode; and the sending unit is further configured to:

send second indication information to the terminal device, wherein the second indication information indicates a second threshold and a third threshold; and the second threshold corresponds to the third SSB group, the third threshold corresponds to the fourth SSB group, and the second threshold is different from the third threshold; the third random access mode is that the terminal device selects, based on a relationship between a reference signal received power and the second threshold, one uplink carrier from the plurality of uplink carriers to send the random access signal to the network device; and the fourth random access mode is that the terminal device selects, based on a relationship between a reference signal received power and the third threshold, one uplink carrier from the plurality of uplink carriers to send the random access signal to the network device.

15. The apparatus according to claim 14, wherein the at least one SSB group comprises a first SSB group, and the first SSB group corresponds to a first random access mode; and the first random access mode is that the terminal device sends the random access signal to the network device on a first uplink carrier, and the first uplink carrier is one of a plurality of uplink carriers.

16. The apparatus according to claim 15, wherein the at least one SSB group further comprises a second SSB group, and the second SSB group corresponds to a second random access mode; and the second random access mode is that the terminal device selects, based on a relationship between a reference signal received power and a first threshold, one uplink carrier from the plurality of uplink carriers to send the random access signal to the network device.

* * * * *